US008886556B2

(12) United States Patent  (10) Patent No.: US 8,886,556 B2
Gnanasambandam et al.  (45) Date of Patent: Nov. 11, 2014

(54) SYSTEM AND METHOD FOR GENERATING AND VERIFYING TARGETED ADVERTISEMENTS DELIVERED VIA A PRINTER DEVICE

(75) Inventors: Shanmuga-nathan Gnanasambandam, Webster, NY (US); Steven Jay Harrington, Webster, NY (US); Naveen Sharma, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1543 days.

(21) Appl. No.: 12/245,959

(22) Filed: Oct. 6, 2008

(65) Prior Publication Data
US 2010/0088178 A1  Apr. 8, 2010

(51) Int. Cl.
*G06Q 30/00*  (2012.01)
*G06Q 30/02*  (2012.01)

(52) U.S. Cl.
CPC ............ *G06Q 30/02* (2013.01); *G06Q 30/0251* (2013.01)
USPC .................. 705/14.45; 705/14.49; 705/14.64; 705/14.66

(58) Field of Classification Search
CPC ... G06Q 30/00; G06Q 30/02; G06Q 30/0246; G06Q 30/0251
USPC ...................... 705/14.49, 14.45, 14.64, 14.66
See application file for complete search history.

(56) References Cited

U.S. PATENT DOCUMENTS

| | | | |
|---|---|---|---|
| 6,076,068 A * | 6/2000 | DeLapa et al. | 705/14.26 |
| 6,269,361 B1 * | 7/2001 | Davis et al. | 1/1 |
| 6,357,942 B1 | 3/2002 | Adkins et al. | |
| 6,373,587 B1 | 4/2002 | Sansone | |
| 6,452,512 B1 | 9/2002 | Adkins et al. | |
| 6,471,319 B1 | 10/2002 | Adkins et al. | |
| 6,523,924 B1 | 2/2003 | Adkins et al. | |
| 6,525,837 B1 | 2/2003 | Adkins et al. | |
| 6,567,015 B2 | 5/2003 | Adkins et al. | |
| 6,600,150 B1 | 7/2003 | Adkins et al. | |
| 6,600,151 B2 | 7/2003 | Adkins et al. | |
| 6,609,781 B2 | 8/2003 | Adkins et al. | |

(Continued)

FOREIGN PATENT DOCUMENTS

EP          574224 A2 * 12/1993  ............. G06K 15/00

OTHER PUBLICATIONS

"Pay per Click," *Wikipedia, the Free Encyclopedia*. Oct. 3, 2008. Web. Jan. 11, 2011. <http://en.wikipedia.org/wiki/Pay_per_click>.

*Primary Examiner* — John G Weiss
*Assistant Examiner* — Adam Chornesky
(74) *Attorney, Agent, or Firm* — Fay Sharpe LLP

(57) ABSTRACT

A system and method is provided for providing targeted advertising to a user of a printer assembly having at least one printer device and having data communication capabilities. The printer assembly may include a grid which includes a plurality of printers that share resources and workloads. The aggregator server includes a processor for receiving and storing ad generation criteria from at least one advertiser, receiving target information from at least one printer assembly, and executing a series of programmable instructions. The instructions provide for matching the received target information with stored ad generation criteria, generating ads when a match is found, and delivering ads to the printer assembly for output to a user. Delivery or use of the ad may be verified. Charges may be levied on the advertiser for verified ads and the printer assembly may be credited accordingly, e.g., for subsidizing operating costs associated with the printer assembly.

24 Claims, 6 Drawing Sheets

(56) References Cited

U.S. PATENT DOCUMENTS

| | | |
|---|---|---|
| 6,616,261 B2 | 9/2003 | Adkins et al. |
| 6,624,407 B1 | 9/2003 | Adkins et al. |
| 6,626,513 B2 | 9/2003 | Adkins et al. |
| 6,631,971 B2 | 10/2003 | Adkins et al. |
| 6,637,961 B1 | 10/2003 | Adkins et al. |
| 6,655,777 B2 | 12/2003 | Adkins et al. |
| 6,660,996 B1 | 12/2003 | Adkins et al. |
| 6,768,427 B1 | 7/2004 | Adkins et al. |
| 6,768,558 B1 | 7/2004 | Yamashita et al. |
| 6,823,133 B1 | 11/2004 | Adkins et al. |
| 6,830,399 B2 | 12/2004 | Adkins et al. |
| 6,843,547 B2 | 1/2005 | Adkins et al. |
| 6,865,241 B1 | 3/2005 | Adkins et al. |
| 6,871,926 B2 | 3/2005 | Adkins et al. |
| 6,873,424 B2 * | 3/2005 | Jakobsson et al. ............ 358/1.13 |
| 6,891,635 B2 * | 5/2005 | Dutta ........................... 358/1.15 |
| 6,917,440 B2 | 7/2005 | Kondo |
| 6,963,820 B2 | 11/2005 | Adkins et al. |
| 6,976,798 B2 | 12/2005 | Keane et al. |
| 7,050,726 B2 | 5/2006 | Adkins et al. |
| 7,065,497 B1 * | 6/2006 | Brewster et al. ............ 705/14.61 |
| 7,146,114 B2 | 12/2006 | Frankel et al. |
| 7,240,995 B2 | 7/2007 | Adkins et al. |
| 7,280,772 B2 | 10/2007 | Adkins et al. |
| 7,369,782 B2 | 5/2008 | Adkins et al. |
| 7,376,627 B2 | 5/2008 | Adkins et al. |
| 7,469,107 B2 | 12/2008 | Adkins et al. |
| 7,546,947 B1 * | 6/2009 | Arias ........................... 235/383 |
| 7,585,043 B2 | 9/2009 | Adkins et al. |
| 7,589,850 B2 | 9/2009 | Adkins et al. |
| 7,689,513 B2 | 3/2010 | Adkins et al. |
| 7,739,198 B2 | 6/2010 | Adkins et al. |
| 7,788,490 B2 | 8/2010 | Adkins et al. |
| 7,792,992 B2 | 9/2010 | Gnanasambandam et al. |
| 7,798,594 B2 | 9/2010 | Adkins et al. |
| 7,859,412 B2 | 12/2010 | Kothari et al. |
| 7,949,560 B2 * | 5/2011 | Peeters et al. .............. 705/14.39 |
| 8,120,803 B2 * | 2/2012 | Uchida ........................ 358/1.15 |
| 2004/0008371 A1 | 1/2004 | Keane et al. |
| 2004/0177000 A1 * | 9/2004 | Takamine ....................... 705/14 |
| 2005/0091343 A1 | 4/2005 | Murray, Jr. |
| 2005/0097198 A1 * | 5/2005 | Getler et al. .................. 709/223 |
| 2006/0004672 A1 | 1/2006 | Leute |
| 2006/0095280 A1 | 5/2006 | Gooding |
| 2006/0120735 A1 | 6/2006 | Adkins et al. |
| 2006/0190324 A1 | 8/2006 | Adkins et al. |
| 2006/0259983 A1 * | 11/2006 | Sperry ........................... 726/28 |
| 2007/0061268 A1 | 3/2007 | Herold et al. |
| 2007/0067297 A1 * | 3/2007 | Kublickis ......................... 707/9 |
| 2007/0075137 A1 | 4/2007 | Adkins et al. |
| 2007/0077074 A1 | 4/2007 | Adkins et al. |
| 2007/0079125 A1 | 4/2007 | Adkins et al. |
| 2007/0088608 A1 * | 4/2007 | Fogelson ........................ 705/14 |
| 2007/0088613 A1 | 4/2007 | Adkins et al. |
| 2007/0136137 A1 * | 6/2007 | Weller ........................... 705/14 |
| 2007/0260716 A1 | 11/2007 | Gnanasambandam et al. ............................ 709/223 |
| 2007/0300142 A1 * | 12/2007 | King et al. .................. 715/500 |
| 2008/0065477 A1 * | 3/2008 | Korhonen ...................... 705/14 |
| 2008/0140500 A1 * | 6/2008 | Kurkure ......................... 705/10 |
| 2008/0181622 A1 | 7/2008 | Adkins et al. |
| 2008/0186187 A1 | 8/2008 | Adkins et al. |
| 2008/0186367 A1 | 8/2008 | Adkins et al. |
| 2008/0313035 A1 * | 12/2008 | Peeters et al. .................. 705/14 |
| 2008/0313036 A1 * | 12/2008 | Mosko et al. ................... 705/14 |
| 2008/0319845 A1 * | 12/2008 | Adkins et al. .................. 705/14 |
| 2009/0300215 A1 * | 12/2009 | Gnanasambandam et al. ............................ 709/242 |
| 2010/0088178 A1 * | 4/2010 | Gnanasambandam et al. ......................... 705/14.49 |
| 2010/0097626 A1 | 4/2010 | Moore et al. |
| 2010/0196075 A1 | 8/2010 | Tredoux et al. |
| 2010/0264214 A1 | 10/2010 | Gnanasambandam et al. |
| 2010/0268591 A1 | 10/2010 | Gnanasambandam et al. |

\* cited by examiner

SYSTEM AND METHOD FOR GENERATING AND VERIFYING TARGETED ADVERTISEMENTS DELIVERED VIA A PRINTER DEVICE

BACKGROUND

This disclosure relates generally to a system and method for generating targeted advertisements, and more particularly to a system and method for generating and verifying targeted advertisements delivered via a printer assembly including at least one printer device. It is currently known for advertisers to use publicly available information for targeting potential and publicly available clients. Additionally, advertisers may use the publicly available information for advertising merchandise that is likely to be of interest to a particular person.

SUMMARY

Accordingly, it is an aspect of the present disclosure to provide a system and method for generating and verifying targeted advertisements (ads).

In accordance with one aspect of the present disclosure, there is provided an aggregator server for providing targeted advertising to a user of at least one printer assembly, each printer assembly including at least one printer device and having data communication capabilities. The aggregator server includes a processor for receiving and storing ad generation criteria from at least one advertiser, receiving target information from a printer assembly of the at least one printer assembly, and executing a series of programmable instructions. The instructions include an ad generation module for matching the received target information with the stored ad generation criteria, generating at least one ad when a match is found, and delivering the at least one ad to the printer assembly for delivery to a user of the printer assembly.

Pursuant to another aspect of the present disclosure, there is provided a printer assembly including at least one printer device receiving print job requests submitted by at least one user. The printer assembly includes a communication interface for providing data communication with an aggregator server which generates at least one targeted ad, the data communication including providing target information to the aggregator server and delivering the at least one targeted ad to the user. The printer assembly further includes a processor for executing a series of programmable instructions. The instructions include a content/context retriever module for retrieving the target information including at least one of content and context information associated with a job request submitted to the printer assembly by a user.

Pursuant to still another aspect of the present disclosure, there is provided a method for providing targeted advertising to at least one device having data communication capabilities. The method includes receiving and storing ad generation criteria from at least one advertiser, receiving target information from at least one of the devices, comparing the received target information with the ad generation criteria, and generating at least one ad based on results of the comparison.

BRIEF DESCRIPTION OF THE DRAWINGS

Various embodiments of the present disclosure will be described herein below with reference to the figures wherein.

DETAILED DESCRIPTION OF THE PREFERRED EMBODIMENTS

Figure 1:
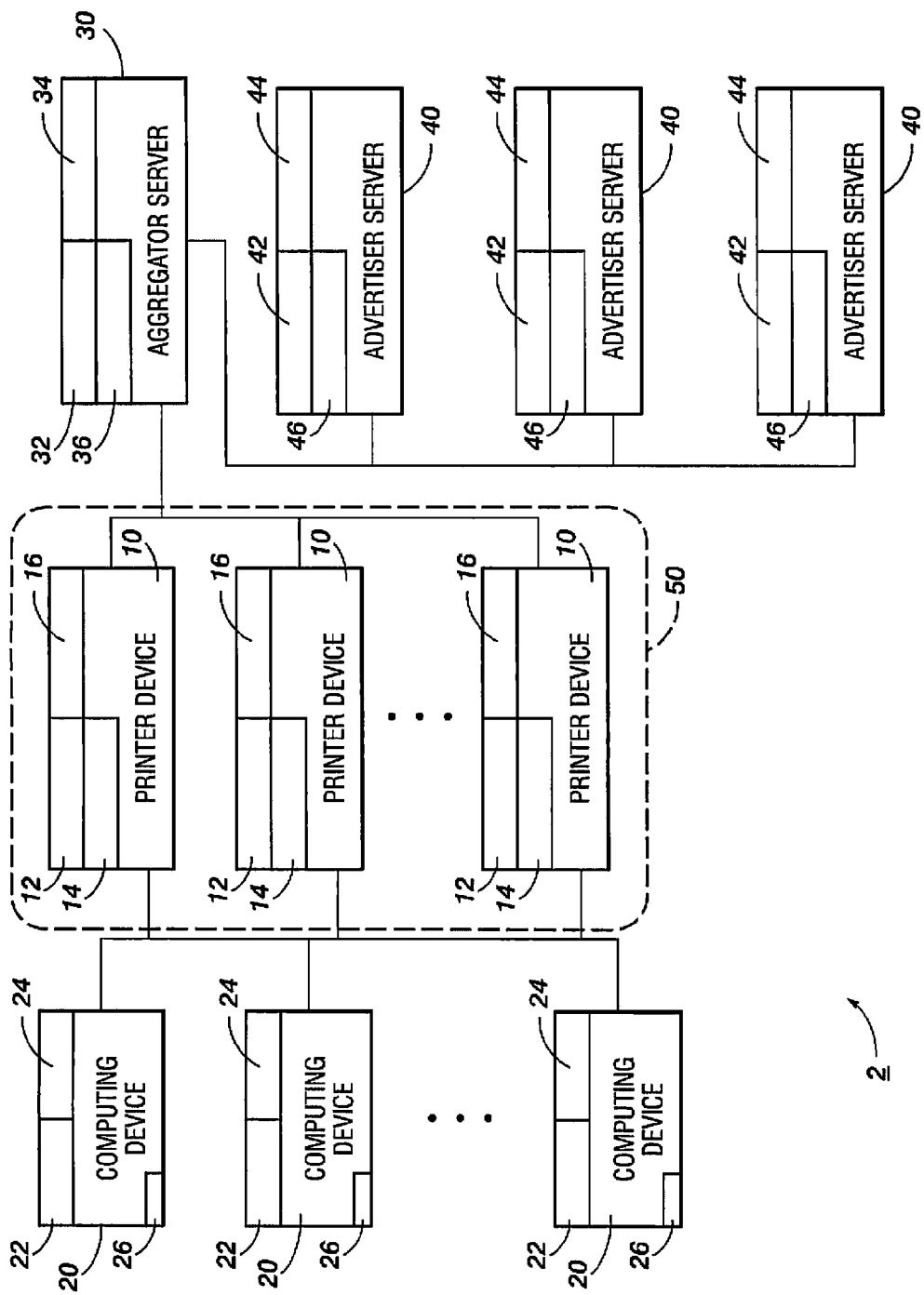
FIG. 1 is a block diagram of an exemplary system for monetizing information in a printing environment in accordance with the present disclosure.

For a general understanding of the features of the present disclosure, reference is made to the drawings. In the drawings, like reference numerals have been used throughout to identify identical elements. With reference to FIG. 1, a system for monetizing information in a printing environment is designated generally by reference numeral 2. Monetizing information includes using the information to generate targeted advertisements (ads) and/or verifying that a predetermined action was performed using the generated ad(s). The system 2 includes at least one printer device 10 in data communication with at least one computing device 20. The at least one printer device 10 is in data communication with an aggregator server 30, which is in data communication with at least one advertiser server 40.

The at least one printer device 10 receives a print job request from the at least one computing device 20 and retrieves target information including context and/or content data. The print job request includes a request to print data, and the data which is requested to be printed. The request includes information, such as where (e.g., which printer device 10 should print the data), when to print the data, and how to print the data (e.g., how many copies, paper size to be printed on, paper orientation, etc.). The content data includes information included in the data to be printed, which may include, for example, textual and/or graphical information, and may also include the structure, design and/or layout of the information. The context data includes information related at least to a user that sent a job request, the job request itself, and/or job requests previously sent to the printer device 10 handling the job request and/or one of the other printer devices 10.

The at least one printer device 10 sends the retrieved target information to the aggregator server 30. The aggregator server 30 has previously set up accounts with at least one advertiser, including receiving ad generation criteria from an advertiser server 40 associated with the respective advertiser. The aggregator server 30 compares the target information to stored ad generation criteria. When a match is found between the target information and ad generation criteria, the aggregator server 30 generates an ad which it delivers to the source of the print job request on behalf of each advertiser associated with the matching ad generation criteria.

The ad includes any data desired by the advertiser to be conveyed to one or more users (e.g., one or more persons using the at least one printer device 10 or computing device 10 in communication with the at least one printer device 10). This may include, for example, text, graphics, a link (e.g., a URL or telephone number) which can be used by the user(s) to access additional data desired by the advertiser to be conveyed to the user(s). The source of the print job request includes the at least one printer device 10 which received the print request. The advertiser may be any entity conveying data to the user(s), e.g., an external entity, such as a commercial entity advertising a good or service to the user(s). As described below, the advertiser may pay a fee, such as to the aggregator or the owner/lessee of the printer devices 10 for the right to advertise to the user(s). It is envisioned that the printer devices 10 and the advertiser are all controlled by a single entity, and that the ads convey internal or company messages which may be proprietary. Further, the advertiser may not be required to pay a fee for the generation and/or delivery of the ads.

Alternatively, the aggregator server 30 selects one or more advertiser servers 40 and notifies the selected advertiser servers 40 of a targeted ad opportunity. The selected advertiser servers 40 may generate the targeted ads which are to be delivered to the user. The selected advertiser servers 40 may deliver the generated ads directly to the user or to the user via the aggregated server 30. In the current example, the advertiser servers 40 do not have direct access to the user in order to preserve anonymity of the user with respect to the advertiser, and the aggregator server 30 delivers the ads to the user. Examples of targeted ads which an advertiser generates which meet context conditions such as place, time and user history include a printout at lunch time of a pizza coupon for a local restaurant, and an ad for a deal on tires at the nearest auto club.

The predetermined verification action verifies delivery or receipt of the ad and provides feedback to the advertiser. The predetermined verification action may be performed by the printer devices 10, and/or a user of the printer or one of the computing devices 20. The nature and type of action that qualifies as a predetermined verification action may be established by the contracts executed between the aggregator which owns and operates the aggregator server 30, the owners of the respective printer assemblies 50 and the respective advertisers which own (which may include operating or administering) the advertiser servers 30.

A user verifies receipt and/or use of the verifiable ad(s), such as by using a URL provided by the aggregator server 30 to the printer device 10; sending a data communication to the aggregator server, such as faxing or emailing a response verifying receipt of the ad; or redeeming a coupon ad. The URL is used, for example, by activating a hyperlink ad (such as by using a user interface (UI) pointing device, such as mouse, to click on the printer-provided hyperlink). The faxed or emailed response may include a scanned in version of the ad stamped such as with a glyph to validate it. In another example, the printer device 10 verifies output and delivery of the ad by printing the ad and sending notification of the printing action to the aggregator server 30. The notification by the printer device 10 may be, for example, a data communication sent via its communication interface to the aggregator server 30 identifying an ad and stating that it was printed. The notification may further include information such as the time of the printing and an identity of the printer device 10 that performed the printing. Since the printer device 10 may store the ad and provide the ad or the URL to the user's computing device 20, the user can perform a verification action from the printer device 10 or from a computing device 20. Notification of the verification action is provided to the appropriate advertiser server(s) 40 via the aggregator server 30, or alternatively directly by the user.

An accounting is kept of the verified ads. The respective advertisers are charged for each is of its verified ads. Advertisers which do not require verification may be charged at a different rate. The owner of the printer assembly 50 is compensated for each verified ad resulting from target information that it provided. Additionally, an account associated with the aggregator may also be compensated for each verified ad. The amount charged to advertiser and the amount credited to the owners of the printer assembly 50 may depend on the type of verification action that was performed. For example, a verification activity including a user response, such as sending a response to the aggregator server 30 or activating a URL, may carry a higher level of user-perceived importance than simply viewing an online ad or a printed ad, and therefore may incur higher charges to the advertiser and/or larger amounts credited to the owner of the printer assembly 50.

It is envisioned that the advertiser and the owner/lessee are a single entity that pays a fee to the aggregator server 30 for the service provided. The fee may be proportional, for example, to the number of ads delivered. Verification of receipt or use of the ads may or may not be required, and may or may not be used for determining the fees.

In another scenario, it is also envisioned that the advertiser provides a service to the owner/lessee of the printer devices 10 and/or to the users by provided desired information to the users. The owner/lessee of the printer devices 10 may be charged a fee and/or the advertiser may be credited when an ad is delivered to a user. Verification of receipt or use of the ads may or may not be required, and may or may not be used for determining the fees or credits.

The printer device 10 includes any printer device that receives a print job request and executes the print job and has the ability to communicate with the aggregator server 30, such as via access to the internet, either directly through an internet connection or via the computing device 10. The word "printer device" as used herein encompasses any apparatus, such as a digital copier, bookmaking machine, facsimile machine, multifunction machine, etc., which performs a print outputting function for any purpose. The printer device 10 may further include an interface between the printer device and a mobile device and/or the mobile device.

The printer devices 10 may be a single printer device 10, a plurality of individual printer devices 10 that are not in data communication with one another, or an assembly of printer devices 50 including a plurality of printer devices 10 which are configured to be in data communication with at least one other printer device 10 of the group or with a printer server (not shown). The assembly 50 may use serverless distributed monitoring, as described in U.S. patent application Ser. No. 12/129,195, which is herein incorporated by reference in its entirety.

The printer assembly 50 may include a grid which includes at least one printer device 10. The printer devices 10 of the grid form a group in which the printer devices 10 collaborate by sharing loads and resources, such as workload, processing resources and/or storage resources. An interface may be provided between the grid and another computing device, such as a mobile device. The interface provides the interfaced computing device with communication to all of the printer devices 10 in the grid. The grid provides a secure environment in which all of the printer devices 10 in the grid are protected by security or hardware or software provided for the grid, such as firewalls. The grid communicates with the aggregation server 30 or other computing devices as one entity, thus protecting the identity and security of users of the printer devices 10 in the grid.

Nodes (printer devices 10) may join or leave the grid, but the advertising related functionality processing, storage and accessing meta-data) will carry on as long as there is at least one member in the grid. The degree of available functionality of the grid may be scaled up or down, depending on the number of printer devices 10 in the grid.

The printer devices 10 share metadata which may describe the user population and thus provide data relating to users of all of the printer devices 10 in the grid. Data related to the user population and the printer devices 10 included in the grid may be used for generating target information which the grid will provide to the aggregator server 30. Some of the printer devices 10 in the grid may potentially have users in common, and the aggregation of target information may improve the ability to effectively advertise with targeted advertisements. The target information will be searched by the aggregator server 30 for keywords associated with advertisers that the aggregator server 30 is providing a service to. People in the user population and printer devices 10 in the grid may be classified into a variety of categories (e.g., based on demography, subject matter of content of print jobs, printer device usage etc.). Target information submitted to the aggregator server 30 may be collected across the many categories and can then be used collectively by the aggregator server 30 to generate advertisements. This process creates social context and can increase the efficiency of advertising because of the similarities within the user population and printer device usage.

By collaborating, the printer devices 10 can learn from other printer devices 10 in the grid what they did not know themselves. Examples of information that could be shared across printer devices 10 within a grid are synonyms for a keyword, user categories, common contexts, advertisement strategies that led to effective verification in the past, etc. When one printer device 10 does not have stored information which it needs, the printer device may query other printer devices 10 in the grid for relevant information.

While storage is limited on the individual printer devices 10 and there is much information generated by a large user population. The printer devices 10 of the grid may share resources or partition workloads, such as for collecting target information, submitting information to the aggregator server 30, outputting ads to users and storing ads and/or information that can be used as target information.

The method of providing targeted and verifiable ads and the system 2 are now described in greater detail. Each printer device 10 includes a processing device 12, at least one storage device 14 or access to a storage device for storing software modules executable by the processing device 12, and a communication interface 16 including hardware and/or software necessary for providing data communication with the computing device 20 and/or the aggregator server 30. The data communication provided may be wired or wireless. The communication interface 16 may include, for example, a modem, a router, a cable, an Ethernet port, etc.

The printer device 10 may be included in one or more networks which provide for the data communication between the printer device 10 and the computing devices 20, provide for the data communication between the printer devices 10 of the assembly 50, and/or provide communication with the Internet for accessing the aggregator server 30. Alternatively, the printer device 10 may be directly connected, via a wired or wireless connection, with one or more of the devices it is communicating with.

The computing device 20 is a device such as a desktop computer, a mobile device such as a handheld computer or personal digital assistant (PDA), a cellular phone, a microcomputer or mainframe computer. The computing device 20 includes a processor 22, such as a CPU, at least one storage device 24 and/or access to a storage device for storing software modules executable on the processor of the CPU (the storage devices 24 or a portion thereof may be included with the CPU 22), a communication interface 26 including hardware and/or software necessary for providing data communication (wired or wireless) with the at least one printer device 10.

The at least one printer device 10 and the at least one computer device 20 may be provided in a variety of environments and configurations, such as in private settings, e.g., a private home or a business or corporate setting, or a public setting, e.g., a public computing and printing system at a public library or airport terminal. In addition, the printer device 10 and the computer device 20 may combined into a single device, such as a public kiosk provided at an airport terminal. Within the environment, if there are several printer devices 10 or computing devices 20, they may each be stand-alone devices or may networked to one another.

The aggregator server 30 includes a processing device 32, at least one storage device 34 or access to a storage device for storing software modules executable by the processing device 32 and a communication interface 36 including hardware and/or software necessary for providing data communication (wired or wireless) with the printer device 10 and/or the advertiser server 40. The communication interface 36 may include, for example, a modem, a router, a cable, an Ethernet port, etc.

The advertiser server 40 includes a processing device 42, at least one storage device 44 or access to a storage device for storing software modules executable by the processing device 42 and a communication interface 46 including hardware and/or software necessary for providing data communication (wired or wireless) with the aggregator server 30. The communication interface 46 may include, for example, a modem, a router, a cable, an Ethernet port, etc. Data communication between the aggregator server 30 and the advertiser server 40 may be via a network, such as the Internet, an intranet, Ethernet, etc., or via a direct connection. The advertiser servers 40 are not necessarily in data communication with one another, other than, for example, via the Internet.

The software modules associated with the printer device 10 include a series of software instructions executable by the processor 12. The software modules are herein described as individual modules, but one or more of the software modules may be combined into a single module or overlap. The software modules include a content/context retriever (C/CR) module, an aggregator interface module, an ad delivery module, a history maintenance and access module, a glyph generator module, printer device accounting module, and a printer device transaction module.

The C/CR module provides for retrieving information based on a particular user or users of the printer device 10 or users in general of the at least one printer device 10. The information may be retrieved each time a job request is received, on a periodic basis or per administrator preferences. The term, user, as used herein, may refer to a particular user or a population of users using a printer device 10 or the printer assembly 50. The C/CR module searches the retrieved information for keywords, where respective keywords are associated with particular advertisers that administer the respective advertiser servers 40.

An example of a job request is a print job request which includes a file to be printed and data instructing the printer how to print the file. Examples of files to be included with the job request may include an email to be transmitted via email, an email to be printed or faxed, or a word processing or other document to be printed, faxed or attached to an email. The degree of searching is determined ahead of time, such as by an administrator of the printer devices 10 or by user settings. The degree of searching may be determined ahead of time through an agreement or contract with the respective advertisers. A first degree of searching may include searching only the file name of the file submitted with the print job request. A second degree of searching may include searching the content of the file to be printed and/or titles or content of directories browsed by the user. Such searching may include intelligent redaction in which sensitive information is redacted and/or secured and/or not selected by way of the search. Examples of sensitive redaction are described in U.S. patent application Ser. No. 11/129,156 which is incorporated herein by reference in its entirety.

The C/CR module further retrieves context information associated with the print job request. Context information includes, for example, the time and/or date of the job request, the identity of the source of the request, the geographical location of the source of the request, demographic information about user(s), browsing history of the user(s) and/or device usage information. The retrieved content and context information, also referred to herein as target information, may be stored, such as in a database stored by the storage device 12, such as linked to at least one of the user that submitted the job request, the computing device 20 that submitted the job request, or in general to the at least one computing device 20 that submits job requests to the at least one printer 10 or assembly 50. This information can be retrieved at a later date, such as for submission of target information to the aggregator server 30 at any time. Accordingly, the printer devices 10 or the printer assembly 50 may submit target information to the aggregator server 30 in real time as job requests are received or executed by the printer devices 10, or in batches, such as at regular timed or quantity intervals.

The target information gathered by the C/CR module remains within the environment of the printer devices 10 and the computing devices 20, and thus is protected by security, such as firewalls, provided for that environment. For a stand-alone kiosk or printer device 10, the secure environment may be limited to the printer kiosk or printer device 10 itself. For a network of printer devices 10 and computing devices 20, the secure environment may be limited to the network.

When the printer devices 10 are networked and/or configured as a printer assembly 50 (e.g., in a grid configuration), the target information may be social information that is relevant to a group of users that use the printer devices 10 in the network or printer assembly 50. The social information may be used collectively to generate advertisements targeted at the group of users, to sub-groups of the group of users (e.g., users of a selected one or more printer devices 10, such as for a particular department within a corporate environment) or to individual users, such as the user who submitted the job request. The variety of information available, such as via emails, print jobs and faxes, and the social aspect of the information provide a rich amount of information that is of interest to advertisers. Furthermore, availability of social information is conducive to efficiency in advertising because of similarities which exist within the group. Keywords from multiple users may be generated and clustered in a distributed fashion within the fleet using distributed monitoring and storage available by virtue of the fleet configuration.

The target information may include relevant history information maintained by the history maintenance and access module. The C/CR module may prompt ad generation by sending target information including only history information even when a job request is not processed by the printer assembly 50. This prompt may be triggered by an event, such as the occasion of a holiday or birthday or the occurrence of a local, national or global news event, or at regular time intervals. Relevance of the history information may be based on recent history, similarity to retrieved or recent content or context, relationships to retrieved or recent content or context, or related terms.

The aggregator interface module provides the target information to the aggregator server 30 and receives ads which the aggregator server 30 generated. The communication may be performed, for example, by means of a web-service call. The web-service call may include the web address of the source of the web-service call in order for the aggregator server 30 to respond. The aggregator interface module may stall execution (e.g., printing) of the submitted job request for a time period not to exceed a predetermined time interval until one or more ads are received from the aggregator server 30 and the ad is prepared for delivery with the job output to the user. If the aggregator server 30 does not respond within the predetermined time interval by providing one or more ads, the aggregator interface module will provide for having the job request executed without inclusion of the ad(s). The web-service call (or an additional one) may be used to retrieve targeted ads from the aggregator server 30. The web-service call may be time-sensitive.

The ad delivery module merges the ad(s) received from the aggregator interface module into the job output for delivery to the user, or generates an output in which the ad(s) are included. The ad may be delivered in a variety of forms, such as a printed or displayed advertisement, coupon, notice, announcement or digital message that may include a URL (e.g., provided via a hyperlink). For example, where the job is a print job, the ad may be included in the printout, such as on the back of a cover page, on a separator page of a workflow, in the margin of a page associated with the workflow, etc, thus utilizing paper that otherwise is likely to be discarded or wasted. The ad delivery module thus may interact with printer device software that manages document output for merging the ad into the output document so that it is included within the document. Merging the ad may include providing the ad as a separate output that is output immediately before or after the print job output so that it can be collected with the print job output.

Where the job is a fax, the ad may be directed to the sender and/or the recipient. The ads may be incorporated into an outgoing fax that is transmitted from the printer device 10, but in accordance with user preferences the ad delivery may be limited to delivery only at the printer device 10. The ad may be incorporated, for example, into a cover page of an incoming fax or a report page generated in association with an outgoing fax. Where the job is an incoming email, the ad may be incorporated into the email, such as in the form of a footer or header. Where the job is an outgoing email, the sender may receive an email or other notification from the printer device 10 that includes the ads. For all jobs, the printer device 10 may transmit an email or other notification to the user or the computing device 20 used by the user which includes the ads. Notifications may be sent from the printer device 10 to the user's computing device 20 via a printer driver which is a software module provided with the computing device 20 that is executable by the CPU 22. Notifications and ads sent via email or the printer driver may include a URL (such as provided via a hyperlink) and/or a printable ad, such as a coupon. A printer provided URL or hyperlink, when activated, such as by clicking on it, is directed to the aggregator server 30 and may provide a displayed or printable ad or coupon or provides a link that the user may use to access, for example, a printable ad, a coupon or a website. The printer device 10 may send an ad in a pop-up window that pops up on the monitor of the user's computing device 20 in response to a message sent by the ad delivery module to the printer driver software module. The pop-up ad may include the URL.

An ad including a notification message or a URL may be provided via a user interface (UI) provided with the printer device 10. The user may operate the printer device's 10 UI to type in a URL for performing a verification act and for accessing or printing information related to the advertiser or a coupon.

The history maintenance and access module maintains history information including a history of collected context and content information and a history of ads which were provided by the aggregator server 30. The history information may be maintained, for example, in a database stored on the storage device 14. The stored target information and the stored ads may be associated with a particular user, a particular computing device 20 and/or a particular printer device 10. The history information is accessible by a user either at a printer device 10 or a computing device 20, but may be password protected in accordance with administrative preferences. For example, a user may only have access to history information associated with that user or a particular computing device 20.

The glyph generator module generates a glyph or similar identifying data (such as an optical code (e.g., barcode), text or symbol) that may be embedded in a data communication output by the printer device 10 to the aggregator server 30 for showing authenticity of generation of the output by the printer device 10. The identifying data may identify the identity of the user, printer device 10 and/or the printer assembly 50, and may further identify an ad for which verification is being provided. For example, the glyph generator module may generate a glyph that is embedded in a data communication sent by the user to the aggregator, e.g., via a facsimile message. The aggregator server 30 will be able to detect the glyph upon receipt of the data communication. Detection of the glyph identifies and authenticates the origin of the data communication and provides confirmation that the user performed a verification action associated with the ad.

The printer device accounting module maintains an account associated with the aggregator and/or the advertisers. A variety of accounting schemes may be used. In the current example, the advertiser pays fees in accordance with the number of its ads that are verified. The aggregator determines when an ad has been verified. A percentage of the fees go to an owner of the printer devices 10, and a percentage of the fees go to the aggregator. The fees that go to the owner of the printer devices 10 may be used to pay for or subsidize operating costs of the printer devices 10, such as the cost of paper and toner. The printer device transaction module processes a financial transaction between the printer device 10 and the aggregator server 30 and/or the advertiser servers 40 for facilitating payment to the owner of the printer devices.

The software module associated with the computer device 20 includes a series of software instructions executable by the processor 12. The software module is herein described as an individual module, but be divided into more than one module. The software module includes a printer driver module which interfaces with at least one of the printer devices 10 for providing communication between the computer device 20 and the printer devices 10. The printer driver module may include a graphical user interface (GUI) which facilitates communication between a user of the computer device 20 and the printer devices. For example, the printer device 10 may send an ad to the user of the computer device 20 via the printer driver module, wherein the printer driver module displays the ad to the user in a pop-up window. The ad displayed in the pop-up window may include a URL and/or a hyperlink which the user can activate to verify the ad and/or to view advertised material or redeem a coupon.

The software modules associated with the aggregator server 30 include a series of software instructions executable by the processor 12. The software modules are herein described as individual modules, but one or more of the software modules may be combined into a single module or overlap. The aggregator server 30's software modules include an ad generator module, a verifier module, an aggregator accounting module and an aggregator transaction module.

The ad generator module receives the target information from the printer devices 10, receives ad generation criteria from the advertiser servers, matches received target information with ad generation criteria, generates one or more ads when a match is found, and delivers the ads to the source of the target information. The ad generation criteria may include a list of one or more keywords and may further include ad generation conditions. The matching may entail matching text included in the received target information with the one or more keywords. The tightness of the match required may be selectable by the user, operator of the printer assembly and/or the operator of the advertiser server. Tight matching may require an exact or close to exact match of letters which make up the text being compared. Loose matching may only require that the target information include a word which is similar to a keyword or related to the keyword. The degree or type of similarity or relation may be selectable. Types of similarity include different tenses or grammatical forms of the same word, synonyms, or similarity in meaning.

The matching may further entail determining that the target information satisfies one or more ad generation conditions. The ad generation conditions may include, for example, contextual conditions, an exclusivity condition, and/or a prioritization condition. Examples of contextual condition include a temporal and/or geographic range, such that a match will only be found for target information that has temporal and/or geographic data which satisfy the temporal and/or geographic range conditions specified in the ad generation criteria. An exclusivity condition may exist when the advertiser has an exclusivity arrangement. An advertiser may be required to pay of extra fees to have an exclusivity arrangement, and this entitles the advertiser's ad to be the exclusive ad generated when a match is found between received target information and ad generation criteria.

A prioritization condition establishes a prioritization between two or more advertisers whose ad generation criteria match the target information. The advertisers may be charged additional fees in order to be accorded a higher priority level. When a particular advertiser has an exclusivity arrangement and its priority level is higher than other advertiser's priority levels whose ad generation criteria match the same target information, only the particular advertiser's ad will be generated and delivered to the source of the target information. When there is not an exclusivity arrangement, depending upon the arrangement, all or one or more of the ads whose ad generation criteria match the target information may be generated and delivered to the source of the target information. If selected ads are generated and delivered, they may be selected based on the prioritization levels of the advertisers associated with the ads. The opportunity to provide an ad may be auctioned off among advertisers which are interested in advertising based on the target information.

The ad generation module determines that received target information matches with ad generation criteria when one or more keywords included in the ad generation criteria are included in the received target information and any contextual conditions are met. The degree of similarity between the keywords and the terms included in the target information necessary to constitute a match may be selectable and may be tied to contractual terms. The advertiser may be required to pay additional fees for looser matching criteria.

The ads are generated in accordance with advertiser preferences as prearranged between the advertiser and the aggregator. For example, the format and layout of a printable or displayable ad may be prearranged. The layout may be standard or customized.

The ad generation module delivers the generated ad(s) to the source of the target information via the communication pathway between the aggregator server 30 and the at least one printer device 10. The delivery may be directed to the printer assembly 50 in general or a specific printer device 10 of the at least one printer device 10, e.g., the printer device 10 to whom the job request associated with the received target information was submitted. In addition, instructions may be included with the ad for delivery to the user. The delivery may be to a particular user (e.g., the user that generated the job request for which the target information was generated) or any user of the printer device 10. In one example, the ad includes instructions for delivery by the specific printer device 10 to one or more of the computing devices 20, e.g., via the printer drivers of the computing devices 20. In another example, the ad includes instructions for the printer device 10 to print the ad and/or to display the ad on a user interface provided on the printer device 10. The instructions for delivery may also include a request for the printer device 10 to save the ad (or to not save the ad) for future access by a user (the user may be limited to a specific user if so desired).

The verifier module determines when a predetermined action, herein referred to as verification action, has been performed by the user with respect to a received ad. The verification action verifies a usage of the ad. The verification action is specified at the time when the advertiser signs up for the service provided by the aggregator. Exemplary verification actions include redeeming a coupon provided with an ad, activating a URL provided by the printer device 10 with an ad, performing a user action which confirms receipt of the ad, such as faxing a copy of the ad to a facsimile machine associated with the aggregator or responding to the ad by entering a response in a pop-up window, sending a response via a website named in the coupon, and/or sending an email to the aggregator, where the email includes information that confirms receipt of the coupon. Redemption of a coupon may be performed online or physically, such as by physically presenting the coupon to a merchant at the merchant's physical place of business.

In the present example, each verification action is directed at or received by the aggregator and includes providing the aggregator with information that identifies the advertiser associated with the ad being verified. However, some verification actions are more readily performed by the user interacting directly with the advertiser, such as physical redemption of a coupon, or visiting a website associated with the advertiser. In such instances, the aggregator needs to be notified that the verification action was performed.

Notification may be provided by the user or the advertiser, however there may be a disincentive for the advertiser to provide such notification, since the fees that the advertiser is charged are proportionate to the number of ads that are verified by verification of performance of the verification action. Accordingly, reliability may be maximized by providing notification to the aggregator server 30 via the user or a user action. The user action may be performed at the printer device 10 or a different device. For example, where the verification action is activation of a URL, the URL may be activated at the user's computing device 20 or at a user interface (e.g., a GUI) provided with the printer device. The verification module may display the URL to the user and/or provide a browser by which the user can select the URL, where the display or browser are provided at the user's computing device 20 or the printer device 10. Alternatively, the user may type in the URL at the computing device 20 or via a user interface at the printer device 10.

Since the aggregator server 30 provides the ads directly to the user and receives notification from the user via a user action, the user, the printer device 10 and the printer assembly 50 may remain anonymous to the advertiser. This is desirable for two reasons. First of all, the user's identity is protected for security purposes. Second of all, if the advertiser were able to independently make direct contact with the user after an initial contact established by the aggregator server 30, the advertiser could bypass the aggregator server 30 for future advertising and access the user directly.

The verifier module provides feedback information to the advertiser server 40 when a verification action is performed verifying an ad for the advertiser associated with the advertiser server to inform the advertiser server 40 of the verification. The feedback information may only identify the printer assembly 50 with which the verification action is associated. In this way, all users of the printer assembly 50 appear as one entity to the advertiser server 40 without revealing any personal or account information about the users to the advertiser server 40. For example, a verification activity may be reported to the advertiser server 40 (e.g., in a computer understandable format, such as XML, etc.) as follows: "A user belonging to a 5000 member account (in this case the printer assembly owner prefers that the account name not be revealed) in the Webster, N.Y. area printed and marked on an automobile services ad (exact ad identifier is revealed) at 5 pm EST." In this example, "marked on" refers to scanning in the advertisement, or a portion thereof, and submitting it to the aggregator server 30 by a printer device 10 (e.g., via email or fax) with a validation mark, such as the user's signature or a glyph embedded by the printer device 10 provided on the submitted document (i.e., scanned in ad).

The aggregator accounting module keeps an accounting of the fees which are to be charged to the respective advertisers. The fees are generally associated with notification via a verification action that receipt of an ad was verified by a user, and special arrangements for advertisement generation, such as exclusivity or prioritization arrangements. The service provided to the users and/or the owner of the printer devices 10 may be provided free of charge, with the aggregator operating based on the revenues received by the advertisers. Furthermore, the aggregator may pass on a percentage of the revenues associated with ad verification to the owner of the printer devices 10. As a result, the owner of the printer devices 10 and/or the users benefit by receiving coupons and discounts provided by the advertisers via the ads, and some revenue which supplements, covers or exceeds the cost of operating the printer devices. Such costs include, for example, toner, paper and/or any maintenance charges.

The aggregator may provide services to many individual printer assemblies. These printer assemblies may be independent of one another and owned and/or operated by different entities. The advertisers may have access to all or some of the printer assemblies, such as according to the contract executed by the advertiser and/or the owner of the printer assembly with the aggregator.

The aggregator transaction module processes transactions between the aggregator and the owner of the printer devices 10 and/or the advertiser based on accounting reports generated by the aggregator accounting module. The transaction module may interact with financial institutions associated with each of the parties to facilitate the transactions. The aggregator transaction module may delay consummation of a transaction if there is a discrepancy in the amount of money to be exchanged. The same is true for the printer device or transaction module and/or transaction modules associated with the advertiser servers 40.

The software modules associated with the respective advertiser servers 40 each include a series of software instructions executable by the processor 42 and include modules for ordering ads with the aggregator server 30, keeping an accounting and facilitating transactions with the aggregator server 30.

Figure 2A:
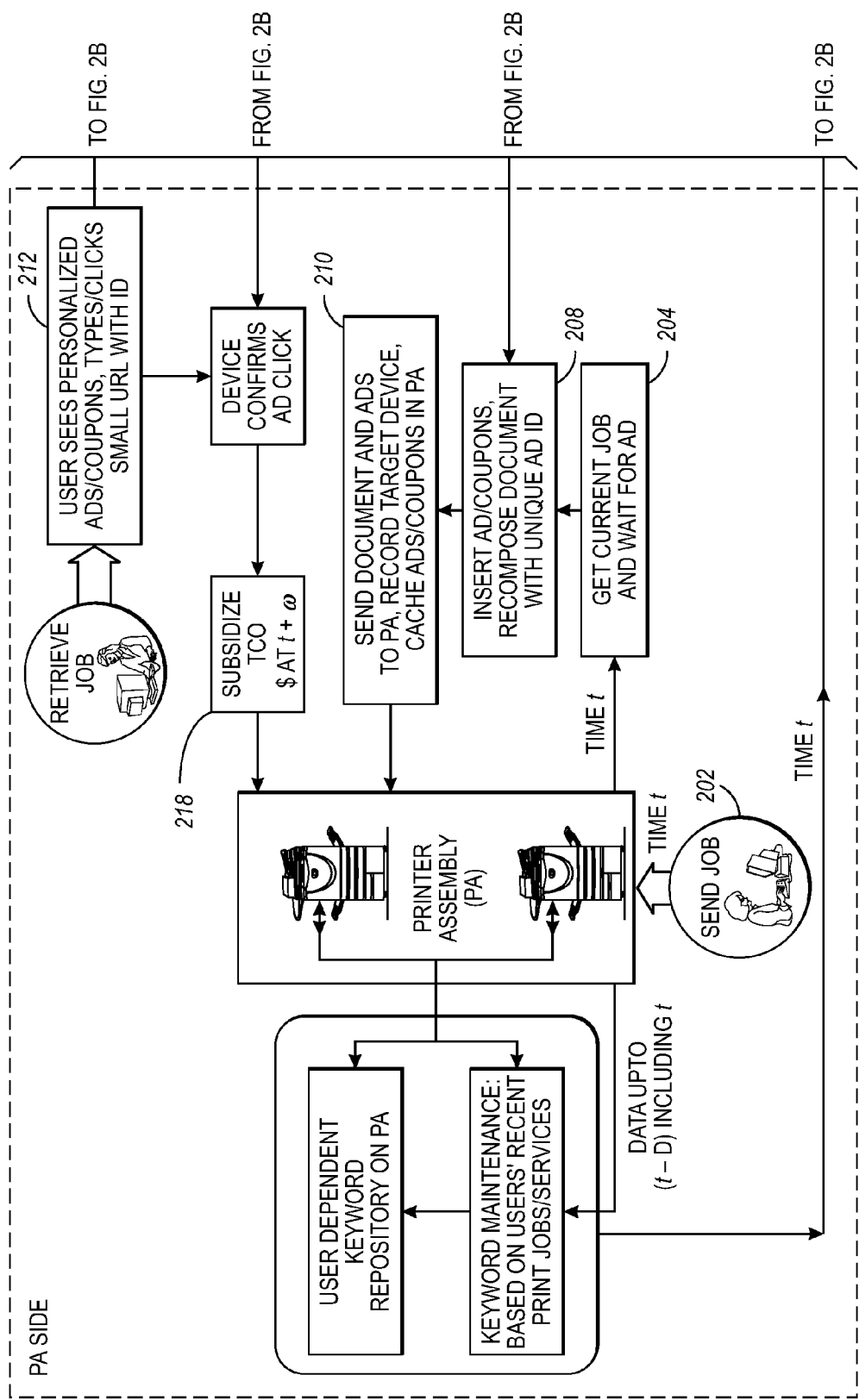
FIG. 2A is a flowchart directed to an operation for generating ads performed by a printer assembly of the system shown in FIG. 1.
Figure 2B:
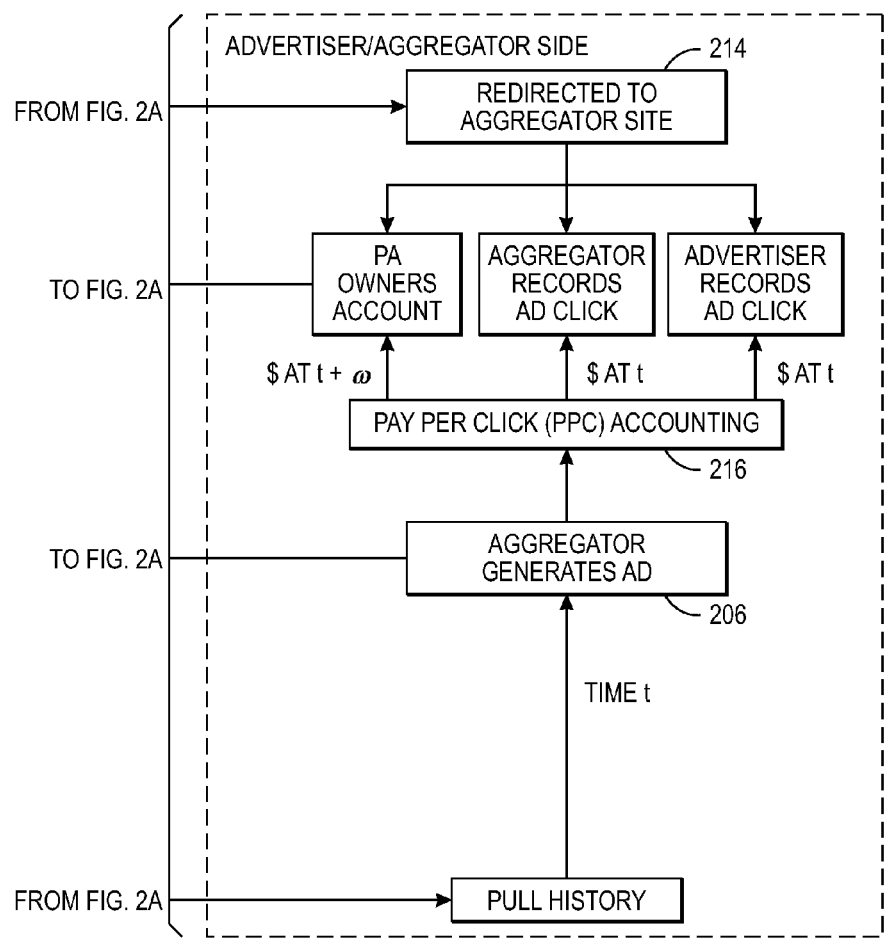
FIG. 2B is a flowchart being directed to the operation for generating ads performed by an aggregator server of the system.

With reference to FIGS. 2A and 2B, operation of the system of monetizing information 2 is described in the context of generation of an exemplary ad. At step 202, the user sends a job request to a printer device 10 or the printer assembly 50 at time 1. The C/CP module of the printer assembly 50 (or a particular printer device 10 if the job request was sent to the particular printer device 10) receives the job request and retrieves keywords and dispatches them to the aggregator server 30. A keyword history may be stored in the storage device 12 for a predetermined interval of time designated as (t-.DELTA.) time units. At step 204, one of the printer devices 10 of the printer assembly 50 (the target printer device 10) is selected to process the job and waits for the receipt of the ad or ads before actually processing the job. At step 206, the ad generation module of the aggregator server 30 quickly generates one or more ads.

At step 208, the ad delivery module merges the generated ad(s) with the job output (e.g., in the cover page). At step 210, the ad(s) are delivered, which in the current example may include as merged with the printed output of the job. This step may further include providing notification to the aggregator server 30 of output to the user (e.g., printing, transmitting via email or displaying) of the respective ads for the purpose of ad verification. This notification may be omitted when output of the ad is not a criterion for ad verification. The ad(s) and/or the identity of the target printer device 10 may be stored in storage device 12. The ad may be temporarily stored in the device (e.g., cached) for a predetermined period of time before purging it from the printer assembly 50, grid or printer devices 10. The printer assembly 50 may provide notification to the aggregator server 30 of output of each respective ad for the purpose of verification depending on the type of verification agreed upon by the parties (i.e., the printer assembly owner, the aggregator and the respective advertisers). At step 212, the user retrieves the job output, views the ad(s) and may respond to the ad(s) by performing a verification action associated with each ad, such as by entering a URL at a user interface provided with the target printer device 10 or clicking on a URL provided at the user interface.

At step 214, the response to the ad(s) is recognized by the verifier module of the aggregator server 30 for the purpose of ad verification. The response to an ad may include clicking on a pop-up window displayed at the computing device 20, faxing or scanning in and then sending the ad to the aggregator or aggregator server 30 after checking selected check-boxes provided on the ad, and/or responding to an email provided by the aggregator server 30. The fax may include an insertion such as a glyph or optical code (e.g., barcode), text or symbol generated and inserted by the printer device 10 which provides information to the aggregator 30 useful for establishing verification. Step 214 may be omitted when performance of a user verification action is not a criterion for ad verification.

At step 216, the aggregator server 30 records the received response to the ad(s) and determines payment owed by the advertiser and to the printer assembly 50 in accordance with pay-per-verification accounting. Payment may be determined between the aggregator and the advertiser at time t and then between the aggregator and the printer assembly owner at time t+ω. Payment is based on ad verification for each ad using the ad verification method of choice, which may include verification of output to the user (e.g., printing, transmitting by email, or displaying) of the ad and/or performance of a user verification action associated with the ad (e.g., activating a URL or returning by email or fax a scanned in marked-up ad). At step 218, the aggregator pays the printer assembly owner using the respective transaction modules. This may be performed as per a pre-established schedule.

Figure 3:
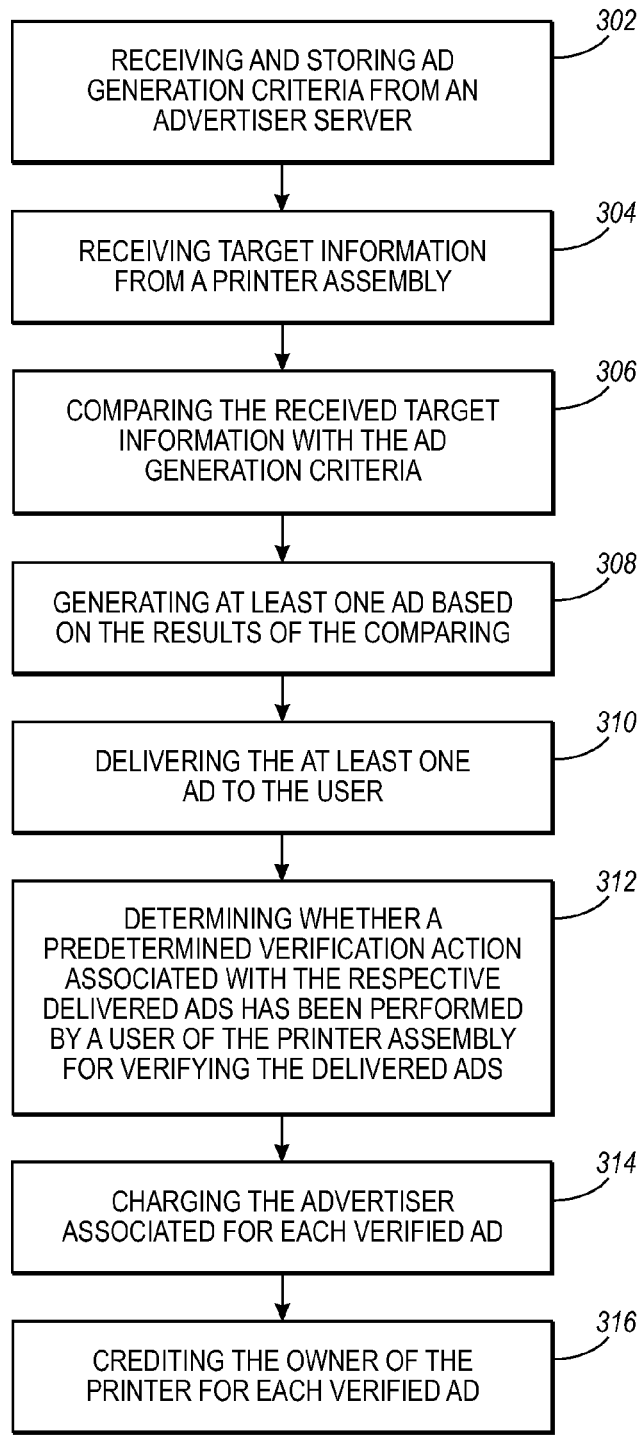
FIG. 3 is a flowchart directed to an operation performed by a printer assembly of the system of FIG. 1 in response to a job request.

FIG. 3 shows steps performed by the aggregator server 30 for generating and verifying targeted ads. At step 302, the aggregator server 30 receives and stores ad generation criteria from an advertiser server. At step 304, the target information is received from the printer assembly 50. At step 306, the aggregator server 30 compares the received target information with the stored ad generation criteria. At step 308, at least one ad is generated based on the results of the comparison, e.g., when a match is found. At step 310, the aggregator server 30 delivers the at least one ad to the printer assembly 50.

At step 312, the aggregator server 30 determines whether ad verification has been performed for the generated ads. The ad verification may include receipt of notification of a predetermined verification action performed by a user of the printer assembly 50 associated with the respective ads and/or notification that the respective ads were output to a user. The verification act verifies a usage of the delivered ad. At steps 314 and 316, the advertiser associated with each verified ad is charged for the verified ad and the owner of the printer assembly 50 is credited for each verified ad delivered to the printer assembly 50 or a user thereof. The amount charged and credited may vary depending on the type of ad verification used.

Figure 4:
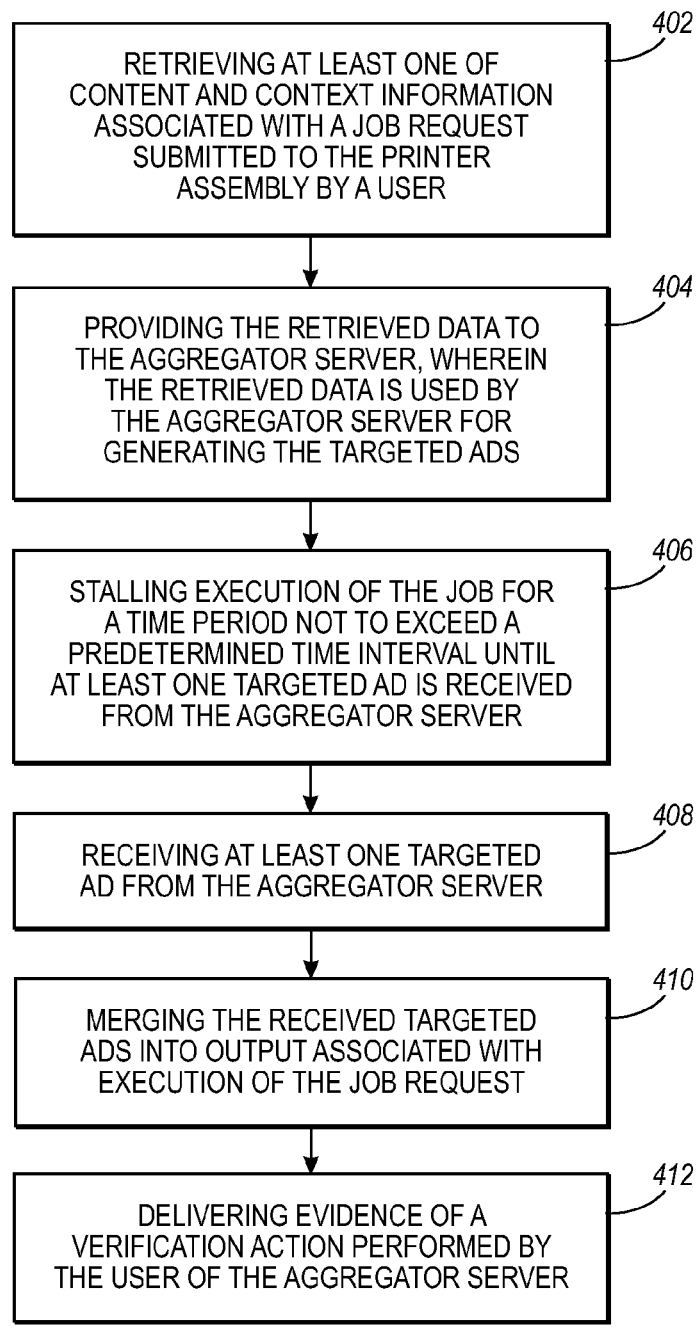
FIG. 4 is a flowchart directed to an operation for monetizing information in accordance with a second embodiment of the present disclosure.

FIG. 4 shows steps performed by the printer assembly 50 or printer device 10 when a job request is received. For simplicity, the steps will be described as being performed by the printer assembly 50, although they could be performed by one of the printer devices 10. At step 402, the printer assembly 50 retrieves at least one of content and context information associated with a job request submitted to the printer assembly 50 by a user. At step 404, the printer assembly 50 provides the retrieved data to the aggregator server 30, wherein the retrieved data is used by the aggregator server 30 for generating the targeted advertisements.

At step 406, the printer assembly 50 stalls execution of the job for a time period not to exceed a predetermined time interval until at least one targeted ad is received from the aggregator server 30. At step 408, the printer assembly 50 receives at least one targeted ad from the aggregator server 30. At step 410, the printer assembly 50 merges targeted ads received from the aggregator server 30 into output associated with execution of the job request. When ad verification requires notification of output of the ad by the printer assembly 50, the printer assembly 50 provides notification of execution of the job with the merged ad. At step 412, when ad verification requires notification of a user verification action, the printer assembly 50 delivers evidence of a verification action performed by the user which verifies a usage of the delivered ad to the aggregator server 30. The evidence may include, for example, confirmation that the user activated a URL or transmitted a fax to the aggregator server 30 with a glyph identifying the ad being verified and/or the user.

A business model using the system for monetizing information 2 may include a provider of services and consumables (e.g., toner) to the printer assembly 50. Such providers are often manufacturers or distributors of the printer devices 20 or other contractors who provide services and consumables associated with the printer devices as per a contract. The provider may be, for example, a printer manufacturer that provides service and consumables via a contract associated with the selling or leasing of the printer devices 10 in the printer assembly 50. The printer assembly owner pays a fee to the provider for the service and consumables. The printer assembly owner may actually be a lessee that leases the printer assembly 50 from a leaser. The provider of services and consumables may be the leaser. The service provided may be, for example, maintenance and/or repair services. The consumables may be for example toner, oil and/or paper. In a first business model, the advertisers pay the aggregator for each verified targeted ad which had been delivered to the printer assembly 50, and the aggregator pays the owner of the printer assembly a percentage of the money received from the advertisers. The printer owner may use the money received from the aggregator to subsidize the cost of the contract with the provider for the service and consumables.

In a second business model, the advertisers pay the aggregator for each verified targeted ad which had been delivered to the printer assembly 50, and the aggregator pays the provider a percentage of money received from the advertisers. The money paid by the aggregator to the provider subsidizes the contract fee for the service and consumables. The printer assembly owner pays the provider any additional fees required by the contract for service and consumables, such as a one time payment for enabling service and reduced periodic fees, where the reduction depends on the amount of verified ads.

Figure 5:
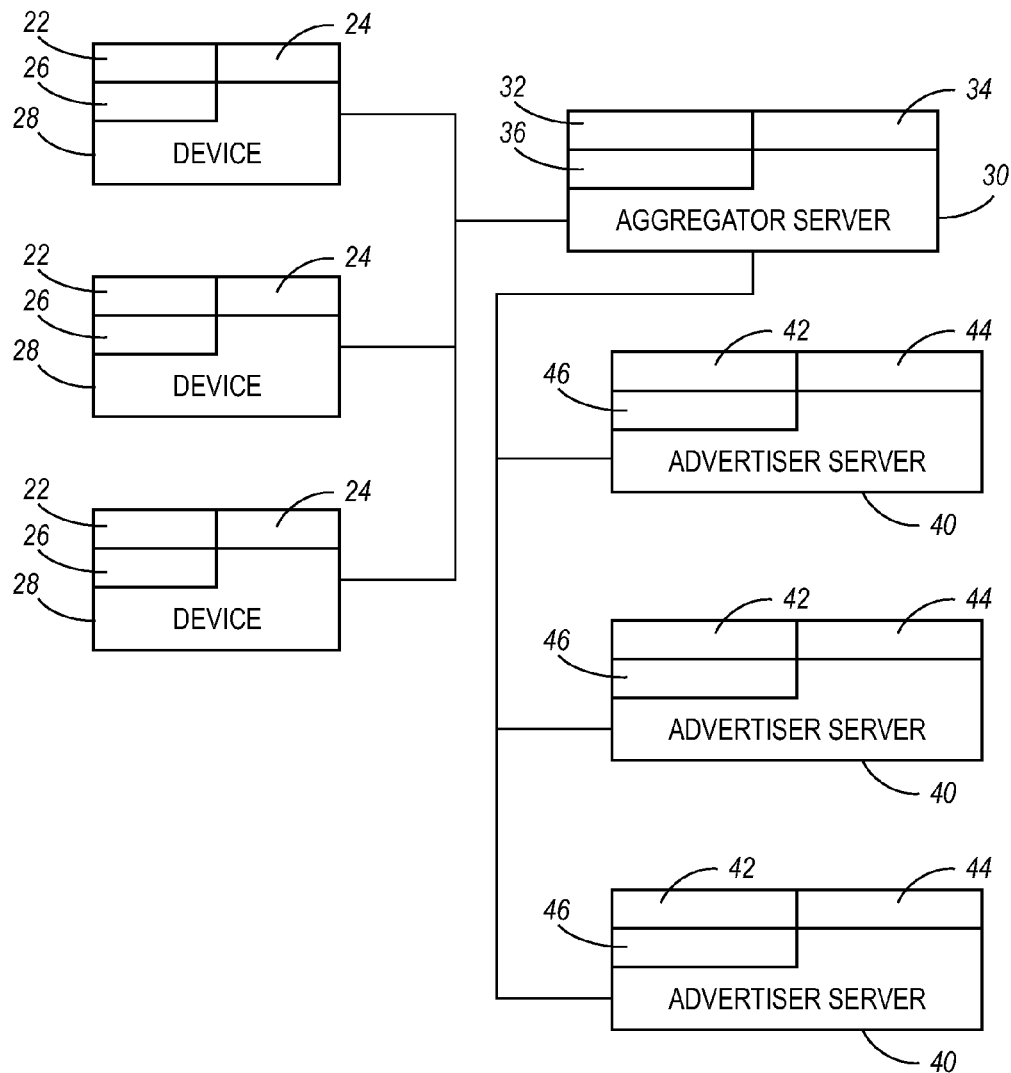
FIG. 5 is a block diagram of alternate system for generating and verifying targeted advertisements.

FIG. 5 shows an alternative system for monetizing information in which the aggregator server interfaces with other devices 28 having data communication capabilities (such as mobile devices, cellular phones or GPS devices) other than printer devices 10. Devices 28 each include a processor 22, at least one storage device 24 and/or access to a storage device for storing software modules executable on the processor 22, and a communication interface 26 which includes hardware and/or software necessary for providing data communication (wired or wireless) with the device 28. Target information may be retrieved by the aggregator server 30, with the user's consent, or by the device 28 itself. Content may be retrieved from publicly available information related to user activity on the device 28. For example, where the device 28 is a cell phone, public information related to dialed phone numbers, such as identity, type of establishment, location, may be included in the target information. Where the device 28 is a GPS device, public information related to a location that the user is approaching may be included in the target device.

Contextual information may be retrieved from historical data stored on the device 28, temporal data related to a user action with the device 28, geographical location data gleaned from GPS activity or cellular call activity, etc. The user may register with the aggregator 30 by setting up an account and establishing user preferences that control the aggregator's access to data related to the user activity. The aggregator server 30 delivers ads which are displayable at the device 28 and may include URLs for the user to activate. Coupons may be delivered, such as by providing a special number that the user can use to redeem a service or good. The device 28 is used to verify ads, such as by activating the URLs. Various business models may be used in which the aggregator pays the user directly or pays a service provider (e.g., a GPS service provider, an internet service provider or a cellular phone service provider) which provides a service to the user which enables the user to use the device.

While people often find advertisements to be unwanted and a nuisance, the targeted ads might be perceived by the users as useful because of the targeted quality of the ads. The owner of the printer devices 10 may find the advertising desirable due to the benefits reaped by payments from the aggregator, which may be used to subsidize or cover operation costs. Additionally, since the printer devices 10 and users are located in a secure zone, e.g., behind a firewall, security is not compromised. With the aggregator acting as a middleman the user and printer device identities and addresses are not disclosed to the advertisers. Advertisers have access to a group of users that they would not otherwise be able to reach and are willing to pay for the opportunity and to offer special deals to the users of the printer assembly. The aggregator has an untapped advertising opportunity with the promise of revenues.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The claims can encompass embodiments in hardware, software, or a combination thereof.

The invention claimed is:

1. An aggregator server for providing targeted advertising to a user of at least one printer assembly, each printer assembly including at least one printer device and having data communication capabilities, the aggregator server comprising:
   a processor, the processor being adapted to:
      receive, store, and access ad generation criteria transmitted from at least one associated advertiser server,
      receive target information transmitted from a printer device of the at least one printer assembly,
      search for an ad opportunity based on the received target information and the stored ad generation criteria;
      in response to matching the received target information with the ad opportunity in a timer period that does not exceed a predetermined time interval:
         notify the at least one associated advertiser server of the ad opportunity,
         receive at least one ad generated from the associated advertiser server and based on the match, and
         relay the at least one ad to the printer assembly for delivery to a user of the printer assembly,
      in response to searching for the time period exceeding the predetermined time interval, send an instruction to execute the print job without relaying the at least one ad.

2. The aggregator server according to claim 1, wherein the ad generation criteria includes at least one of at least one keyword and a contextual condition.

3. The aggregator server according to claim 2, wherein the target information includes data related to a job request submitted by the user of the printer assembly of the at least one printer assembly; and
   wherein the matching includes determining if data included in the target information matches at least one keyword or satisfies the contextual condition included in the ad generation criteria associated with an advertiser of the at least one advertiser.

4. The aggregator server according to claim 1, wherein the programmable instructions further comprise a verifier module for determining whether respective ads of the at least one generated ad were verified by at least one of determining whether a predetermined verification action which verifies a usage of the respective delivered ads was performed by the user of the printer assembly, and receiving notification that the respective delivered ads were output to a user.

5. The aggregator server according to claim 4, wherein the programmable instructions further comprise an accounting module for at least one of charging the advertiser associated with a delivered ad for which a determination was made that the ad was verified, and crediting an owner or lessee of the printer assembly upon the determination that the ad was verified.

6. The aggregator server according to claim 4, wherein the programmable instructions further comprise an accounting module for crediting the account of an owner or lessee of the printer assembly upon the determination that the ad was verified, wherein the account is an account maintained by a provider which has a contract with the owner or lessee of the printer assembly for provision of at least one of service and consumables to the printer assembly.

7. The aggregator server according to claim 6, wherein the amount credited or charged is based on whether a predetermined verification action was performed by the user or notification that the respective delivered ads were output to a user was received.

8. The aggregator server according to claim 1, wherein an identity of the user and printer assembly and contact information associated with the user and printer assembly is not accessible by the advertiser associated with the delivered ad.

9. A printer assembly including at least one printer device receiving print job requests submitted by at least one user, the printer assembly comprising:
a communication interface for providing data communication with an associated aggregator server which generates at least one targeted ad, the data communication interface being adapted to:
receive a request for a print job submitted to the printer assembly by a user;
stall execution of the print job for a predetermined time interval;
provide target information retrieved from the print job to the associated aggregator server,
in response to a time period exceeding the time interval without receiving at least one targeted ad relayed from the associated aggregator server, execute the print job without the at least one targeted ad,
in response to receiving the at least one targeted ad before the time interval,
deliver the at least one targeted ad to the user; and,
a processor for executing a series of programmable instructions, the instructions including a content/context retriever module, the processor adapted to:
retrieve the target information including at least one of content and context information associated with the request for the print job, and
merge the at least one targeted ad with the print job before rendering output of the print job.

10. The printer assembly according to claim 9, wherein the content information includes content included with the job requested.

11. The printer assembly according to claim 9, wherein the context information includes at least one of temporal and geographic information related to the job request, demographic information related to the at least one user of the printer assembly, and information related to usage of the printer assembly.

12. The printer assembly according to claim 9, wherein the programmable instructions further comprise an ad delivery module for merging the at least one targeted ad received from the aggregator server into output associated with execution of the job request.

13. The printer assembly according to claim 12, wherein the ad delivery module further provides data communication from a computing device operated by a user of the printer assembly to the printer assembly for delivering evidence of a verification action performed by the user which verifies a usage of the delivered ad.

14. The printer assembly according to claim 9, further comprising a storage device for storing generated ads, wherein the stored generated ads are accessible for a predetermined time period by a user of the printer assembly.

15. The printer assembly according to claim 9, further comprising a verification module adapted to provide verification data communication to the aggregator server for verifying use of the ad by the user, and the printer device inserts identifying data into the verification data communication for verifying the identity of at least one of the user, the printer device and the printer assembly.

16. The printer assembly according to claim 9, wherein the printer assembly includes a printer grid having at least two printer devices in which the printer devices share at least one of workload, functionality and resources, wherein the printer grid communicates as a single entity with the aggregator server.

17. A method for providing targeted advertising to at least one device having data communication capabilities, the method comprising:
receiving a request for a print job at a printer device;
stalling an execution of the print job for a predetermined time interval;
retrieving at the printer device target information from the print job;
relaying by the printer device the target information to an associated server;
in response to receiving at the printer device at least one advertisement relayed from the associated server before the predetermined time interval, merging the at least one advertisement with the print job at the printer device and processing the print job; and,
in response to not receiving the at least one advertisement before the predetermined time interval, processing the print job without the at least one advertisement.

18. The method according to claim 17, wherein the ad generation criteria includes at least one of at least one keyword and a contextual condition.

19. The method according to claim 18, wherein the retrieving the target information includes:
receiving a select level for searching; and,
retrieving a type of data corresponding to the target information based on the select level for searching;
wherein the data relates to the job request submitted by a user and is compared to ad generation criteria for matching an ad.

20. The method according to claim 17, further comprising determining whether a predetermined verification action which verifies a usage of the delivered ad has been performed by a user of the device for verifying the delivered ad.

21. The method according to claim 17, further comprising at least one of: charging the advertiser for each verified delivered ad to which it is associated, and crediting an owner or lessee of the device for each verified delivered ad.

22. The method according to claim 17, further comprising crediting the account of an owner or lessee of the device upon the determination that the predetermined verification action was performed, wherein the account is an account maintained by a provider which has a contract with the owner or lessee of the device for provision of service to the device.

23. The method according to claim 17, wherein an identity of a user of the device or the device and contact information associated with the user and the device is not accessible by the advertiser associated with the delivered ad.

24. The printer assembly according to claim 9, wherein the printer assembly is further adapted to:
   receive a select level for searching; and,
   retrieve a type of data corresponding to the target information based on the select level for searching.

* * * * *